May 3, 1960         H. A. CLOUD ET AL         2,935,009
HUMIDITY CONTROL MEANS FOR CONTROLLING THE FLOW
OF OUTSIDE AIR THROUGH A CROP STORAGE BUILDING
Filed Aug. 4, 1958

INVENTORS
WILLIAM J. McGOLDRICK, JR.
HAROLD A. CLOUD
BY
*Clyde C. Blinn*
ATTORNEY United States Patent Office 2,935,009
Patented May 3, 1960

2,935,009

HUMIDITY CONTROL MEANS FOR CONTROLLING THE FLOW OF OUTSIDE AIR THROUGH A CROP STORAGE BUILDING

Harold A. Cloud, St. Paul, and William J. McGoldrick, Jr., Shakopee, Minn., assignors to Minneapolis-Honeywell Regulator Company, Minneapolis, Minn., a corporation of Delaware Application August 4, 1958, Serial No. 752,917

7 Claims. (Cl. 98—54)

The present application is a continuation in part of the application entitled "Control Apparatus" Serial No. 668,218, filed June 26, 1957, for the same inventors, now abandoned.

The present invention is concerned with a humidity control system for use in controlling the operation of a fan in a crop storage building, in particular, apparatus for comparing the moisture level of the air in the top level of the grain periodically with the moisture level of the air outdoors. When the air outdoors is of a lower moisture content the fan is allowed to run to bring in the outdoor air thereby reducing the moisture content of the crops in the building. Whenever the relative humidity of the outdoor air is below some predetermined value, the main control is overridden and the fan is allowed to run regardless of the level of the moisture content of the grain.

It has long been recognized that the preservation of stored crops is greatly increased if the moisture content is not allowed to exceed some high level. The use of fans for bringing outdoor air into a crop storage building is quite common. There is a need for a simple and inexpensive controller for controlling the operation of such fans. When a fan is allowed to run continuously not only is the power consumption high but there are periods when the outdoor air is higher in moisture content than the crops and to allow this outdoor air to be drawn through the crops only increases the moisture content of the crop.

The present invention is concerned with the energization of the fan only when it is advantageous to bring in the outdoor air, that is, when the absolute humidity of the outdoor air is lower than the absolute humidity of the air in the crop.

It is therefore an object of the present invention to provide an improved condition control system.

Another object of the present invention is to provide an improved humidity control system.

And still another object of the present invention is to provide a humidity control system for controlling the operation of a fan for bringing outside air into a stored crop whenever the outside air is lower in moisture content than the air in the building.

Another object of the present invention is to provide a control system for the operation of a fan for crop drying when the relative humidity of the outdoor air is below some predetermined value.

These and other objects of the present invention will become apparent upon a study of the specification and drawings of which:

Figure 1:
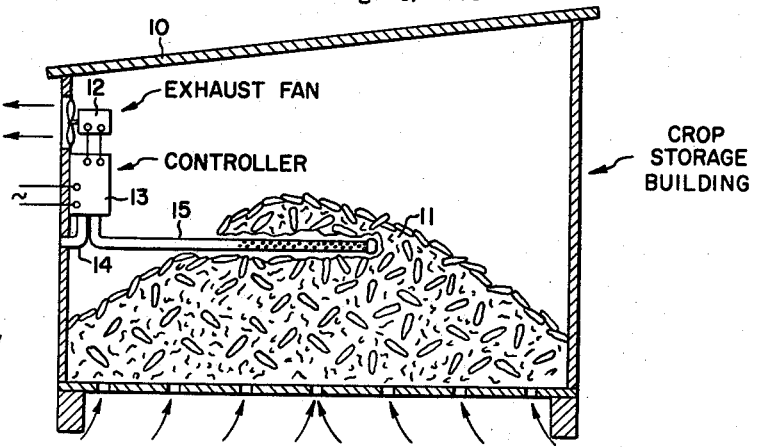
Figure 1 is a schematic view of a typical application for the present invention wherein an exhaust fan is controlled in a crop storage building.

Referring to Figure 1, a building 10 is shown having a crop 11 stored therein. It is commonly known that the moisture of the stored crop can be reduced by moving outdoor air through the crop. While an exhaust type fan 12 is shown, it is obvious that a pressure type fan could be adapted to force outdoor air up through the crop. During the movement of air through the crop, the crop dries from the bottom upward. The upper layer generally has the highest moisture content. A controller 13 is connected to fan 12. Controller 13 has two inlets; so that, air can be sampled from outdoors through a pipe 14 or air can be sampled from the top layer of the crop through a pipe 15. The sampled air exhausts from the top of controller 13.

Figure 2:
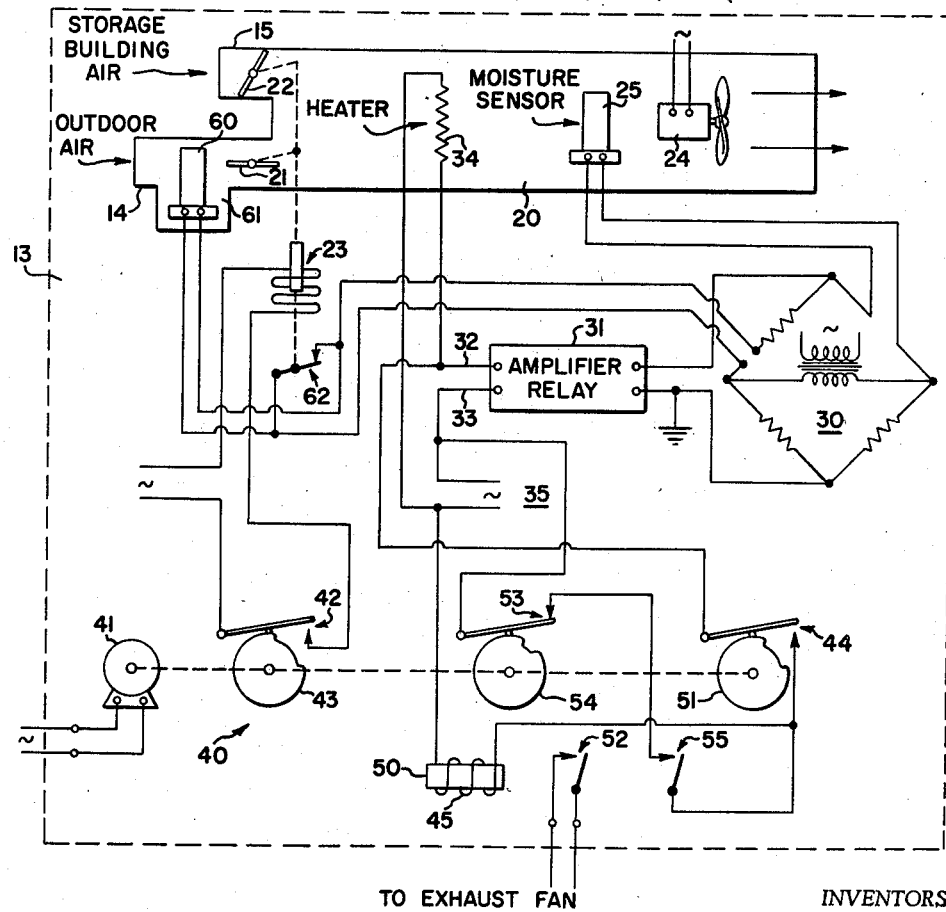
Figure 2 is a schematic drawing of the particular circuit for obtaining the control necessary in the present invention.

Referring to Figure 2 controller 13 is shown in more detail. A chamber 20 having a relatively large thermal mass receives air through either sample pipe 14 or 15 depending upon the position of the respective dampers 21 and 22 as positioned by an actuator or operator 23. The air flow through chamber 20 is accomplished by a motor driven fan 24. Contained in chamber 20 is a moisture responsive device 25 which has an electric resistance which varies with the relative humidity of the air it comes in contact with in the chamber. This sensor is of a conventional type such as the sensor shown in the Dunmore Patent 2,295,570.

Moisture sensor 25 is connected as one leg in a conventional bridge circuit 30 which has its output terminals connected to the input of an amplifier relay 31. The bridge circuit and amplifier relay are of a conventional type; wherein, as the resistance of element 25 changes to unbalance the bridge, a signal is fed into the amplifier to energize a relay thus closing the circuit between output terminals 32 and 33 of the amplifier relay. A typical amplifier relay might be of the type shown in the Albert P. Upton Patent No. 2,423,534.

A heater 34 is mounted in chamber 20 to heat the air as it enters the chamber through pipe 14 or 15. This heater is connected to a source of power 35 through the output terminals of amplifier relay 31; so that, the heater is energized whenever the amplifier relay receives a signal to short its output terminals 32 and 33.

Bridge 30 is calibrated; so that, the relative humidity sensor 25 will control at some predetermined value of relative humidity such as 10% in chamber 20. When the relative humidity exceeds this predetermined value, the bridge is unbalanced in a manner to energize heater 34 to increase the dry bulb temperature of the air passing through chamber 20. An increase in the dry bulb temperature lowers the relative humidity and the bridge circuit becomes satisfied to shut off the heater. The heater is periodically energized to maintain the relative humidity at the selected value. Referring to a psychrometic chart, sensor 25 would control heater 34 to maintain 110° F. in chamber 20 if outdoor air at 60° F. and 50% R.H. entered. When the temperature increased about 110° F., the R.H. would drop below 10% and the heater 34 would be de-energized. The temperature of the air having approximately 38 grains of water per pound of dry air would drop below 110° F., and the R.H. value would increase. Of course, the maintained temperature in chamber 20 will change if the outdoor air humidity level changes. For example, outdoor air at 55° F. and 40% R.H. results in a 97° F. chamber temperature. The control including element 25 maintains the 10% R.H. level in chamber 20 by varying the dry bulb temperature in the chamber.

A timer 40 of a conventional type is driven clockwise by a constant speed motor 41. A first cam operated switch 42 is connected to energize actuator 23 for a short period during each revolution of cam 43. A period of one hour might be selected for the time for one complete revolution of cam 43; thus, each hour actuator 23 will be energized to allow a sample of crop air to enter pipe 15, and at the same time, the outdoor air will be shut off. A second cam operated switch 44 is connected in series with a winding 45 of a control relay 50. The series circuit is connected in parallel with heater 34 so that each time amplifier relay 31 is energized to energize heater 34 control relay 50 will be energized should switch 44 be closed. Cam 51 which is simultaneously driven with cam 43 by the motor has a segment slightly shorter and included in the periods in which switch 42 is closed so that switch 44 closes after switch 42 in time and opens before switch 42, each hour. Switch 52, which is closed when control relay 50 is energized, is adapted to be connected to the exhaust fan 12.

Switch 53, which is operated by a third cam 54 on motor 41, opens for a short period every hour. The time switch 53 is opened is inclusive at the time which switches 44 and 42 are closed so that both switches 44 and 42 first close and then switch 53 opens. Switch 53 closes before either switch 42 or switch 44 opens. A second switch 55 on control relay 50 is closed each time the relay is energized. Switches 53 and 55 are connected in series between terminal 33 of amplifier relay and one extremity of winding 45 which is connected to switch 44. This circuit provides a holding circuit for control relay 50 and once winding 45 is energized through switch 44 it is maintained energized for one hour during the rotation of cam 54 until switch 53 opens.

A second moisture responsive device 60 which is similar to device 25 is connected in an adjacent leg of bridge 30 from device 25. Moisture responsive element 60 is contained in a housing 61 through which the outdoor air is drawn before entering chamber 20. It is obvious that device 60 could be placed anywhere in the outdoor air; however, to make the controller 13 a compact unit, device 60 is mounted as a part of the controller in housing 61. Connected in parallel with device 60 is a switch 62 which is controlled by actuator 23. The switch is closed whenever actuator 23 is de-energized. Device 60 might be calibrated to have a definite change in resistance when the relative humidity of the air surrounding the element exceeds some predetermined value such as 60%.

The circuit heretofore described is one particular type of circuit which might accomplish the present invention. It is of course obvious that there are other circuits which might accomplish the same sort of switching action to bring about the results of this invention.

*Operation*

Let us assume that the controller 13 has been in operation for the last hour and with switch 42 open. Actuator 23 has been de-energized; so that, outdoor air is allowed to enter chamber 20 through pipe 14. The heat level of the heat in chamber 20 is established by heater 34 depending upon the moisture content of the outdoor air. Each time the relative humidity of the air increased above some predetermined value, sensor 25 would cause operation of heater 34 to lower the relative humidity by increasing the dry bulb temperature. Heater 34 would then be turned off and on in a conventional manner to maintain balance in the bridge circuit 30. Referring to a psychrometric chart, assume an outdoor air temperature of 60° F. and a R.H. of 50%. Since sensor 25 is calibrated at 10% R.H., the temperature of chamber 20 is maintained at 110° F. If the outdoor air changed in R.H. or dry-bulb temperature, the temperature of the chamber would be changed. After extended operation, the mass of chamber 20 reaches a temperature depending upon the absolute humidity or moisture content of the outdoor air. As the motor 41 continued to operate and switch 42 closed, a sample of air from the upper layer of crop 11 would then enter pipe 15 and the outdoor air supply would be cut off.

Since the volume of air flowing through chamber 20 is small and the chamber acts as a heat sink, the air from the storage building would be raised to the temperature established in chamber 20 only by the extended operation with outdoor air. Again, referring to a psychrometric chart, assume a grain air temperature of 50° F. and a 90% R.H. When this air was warmed to 110° F., since that is the temperature of chamber 20, a relative humidity above 10% would be experienced by element 25 and the relay would turn on heater 34 through a closed circuit between terminals 32 and 33. As soon as cam 51 moved forward to close switch 44, control relay 50 would then be energized through the control circuit of output terminals 32 and 33 of the amplifier relay. The holding circuit for control relay 50 would then be established when switch 53 closed as the cam 54 moved forward before switch 44 again opened. As the control relay is held in an energized position, exhaust fan 12 would be energized and would remain in operation. Switch 42 would open as the cam 43 progressed and again the outdoor air would be sucked into chamber 20 to establish the equilibrium condition for the moisture content of the outdoor air.

After one hour of operation of the exhaust fan, again a sample of the air in the top layer of the crop would be taken in through pipe 15. If at this time the absolute humidity of the crop had dropped and it was less than the absolute humidity of the outdoor air, amplifier relay would be de-energized to shut off heater 34. For example, assuming the same outdoor air conditions so that chamber 20 was maintained at 110° F., a grain air at 40° F. and a 90% R.H. would cause relay 31 to de-energize heater 34. When switch 44 closed, since the amplifier relay was not energized, controller 50 would not be energized. Since the holding circuit was previously broken by the opening of switch 53, the exhaust fan would be shut down. It would remain shut down for the next hour until cam 43 rotated to again close switch 42 to take another sample of the crop air.

With a controller of this type it is obvious that the exhaust fan would only be placed in operation when the moisture content of the air outside of the crop storage building was less than the moisture content of the air in the top layer of the crop. This not only would save in power consumption of the exhaust fan but on rainy days when the moisture content outside of the building might be quite high no air would be moved through the crop to increase the moisture content of the stored crop. By only using the outdoor air to ventilate the crop storage building when the outdoor air was dryer than the air inside the top of the crop, a maximum drying can be accomplished and the preservation of the crop is greatly increased.

And now considering the operation of moisture responsive device 60. Each time the sampling period takes place, and switch 42 closes, actuator 23 will open switch 62. Element 60 is placed in the bridge circuit in the leg adjacent the element 25. If the relative humidity of the outdoor air is below 60% the resistance of element 60 is of such a value to unbalance bridge 30 in a direction to cause the energization of relay 50 as well as the energization of heater 34. The exhaust fan 12 is then energized as would be the case when the moisture content of the grain or storage building air was greater than the outdoor air. The addition of element 60 to the circuit increases the overall benefit gained by the exhaust fan. Referring to a psychrometric chart, the exhaust fan would be operated whenever the relative humidity was below 60%; that is, anywhere in the area to the right of the 60% relative humidity line.

Assuming the outdoor temperature of 50° F. and a R.H. of 70%, the outdoor air would have a moisture content of 37 grains of water per pound of dry air. When the grain air is dryer than 37 grains, the exhaust fan is de-energized as long as the R.H. is above 60%. If the grain air exceeds the outdoor air in moisture content or the outdoor air R.H. drops below 60% the exhaust fan is turned on. The addition of the outdoor R.H. control increases the usefulness of the exhaust fan. After a cool evening when the outdoor air and grain air has a low dew point temperature, such as 35° F., the morning sun will increase the outdoor temperature and the warm outdoor air will have a low R.H., such as 20% for an 80° F. dry bulb temperature. When the low R.H., warm, outdoor air is pulled through the stored crop, after an initial period and the crop is warmed up, the outdoor air will accomplish drying. There is a "sacrifice period" before the crop is warmed up when moisture is actually added to the crop; however, after the warm-up period, all of the added moisture and more moisture is removed from the crop.

While the present invention has been shown in one specific manner it is obvious that modifications might be made by one skilled in the art, therefore, it is intended that the invention only be limited by the appended claims in which we claim:

1. In a humidity control system for controlling a fan in a crop storage bin to obtain a maximum reduction in the moisture of the storage by pulling outdoor air through the crop, a sampling chamber, air flow inlet damper means, means for inducing flow of outdoor air or air from the top layer of the crop through said chamber depending upon the position of said air flow inlet damper means, a heater in said chamber for heating said chamber and the air passing therethrough, a moisture responsive cell having a resistance that changes with relative humidity of the air to which the cell is exposed, said cell being placed in said chamber, relay means, means including said relay means for connecting said cell to control the operation of said heater so that when the relative humidity of the air in said chamber increases above a predetermined value, said heater is energized, said chamber attaining a predetermined temperature for a predetermined moisture content of said air, timer operated switch means for controlling said inlet damper means to periodically close off said outdoor air supply to said chamber and allow air from the crop to enter said chamber, relay means for controlling the fan, second timer operated switch means for periodically connecting said relay in parallel with said heater so that if the bin air when heated to said predetermined temperature has a higher moisture content than said outdoor air said cell will cause energization of the fan to commence circulation of outdoor air through the storage bin, and third timer operated switch means for providing a holding circuit for said relay means between the sampling periods initiated by said inlet damper means thereby maintaining operation of the fan between sampling periods if the moisture content of the air in the crop is greater than the outdoor air.

2. In a humidity control system for controlling apparatus for decreasing the humidity level in stored materials, a chamber, inlet damper means, means for inducing a sample of outdoor air or a sample of air from the stored material to flow through said chamber depending upon the position of said inlet damper means, heating means associated with said chamber means, relative humidity responsive means responsive to the humidity of the air in said chamber, first means connecting said humidity responsive means in controlling relation to said heating means so that as said relative humidity increases above a predetermined value said heating means is energized, timer operated means for operating said inlet damper means at predetermined intervals to allow air from the space to enter said chamber for a short period of time, relay means adapted to control the apparatus for decreasing the humidity level in the space, timer operated switch means for connecting said relay means to said first means to be energized with said heating means at said predetermined intervals, thus upon the moisture content of the air from the space being greater than the moisture content of the outdoor air the apparatus to reduce the moisture level is energized, and switch means operated by said timer operated means for establishing a holding circuit for said relay means to maintain energization of the apparatus until the next predetermined interval of operation of said inlet damper means.

3. In a humidity control system for controlling the humidity in a space by bringing in outdoor air if it has a lower absolute humidity, relative humidity responsive means, means for inducing the flow of air, valve means for selectively controlling the flow of air so that either outdoor air or air from the space in which the humidity is being controlled can be directed around said responsive means, heating means for heating said outdoor air before it engages said relative humidity responsive means, first relay means connecting said relative humidity responsive means in controlling relation to said heating means so that as the relative humidity exceeds a predetermined value said heating means is energized to increase the outdoor air dry bulb temperature before it comes in contact with said humidity responsive means, said responsive means establishing a predetermined dry bulb temperature depending on the moisture content of the outdoor air, second relay means adapted to control the apparatus for bringing outdoor air into the space, timer operated means for periodically operating said valve means to cause air from the space to enter said chamber to be heated to said predetermined temperature, switch means associated with said timer means for connecting said second relay means to said first relay means each time said valve means causes air from the space to contact said responsive means so that upon the moisture content of the outdoor air being less than the moisture content space air the outdoor air is pulled into said space, and means for maintaining the flow of outdoor air into a space until said valve means is again operated to sample said space air to compare the absolute humidity of the space air and the outdoor air.

4. In a humidity control system for controlling the humidity in a first space by controlling the supply of air from a second space, a chamber, means for inducing air flow through said chamber, relative humidity responsive means being responsive to the humidity level of the air in said chamber, flow control means for selecting whether air in the first or the second space flows through said chamber, first means for varying the relative humidity of the air contacting said responsive means, relay means for connecting said responsive means in a manner to control the operation of said first means whereby as the air from the first space contacts said responsive means its relative humidity will be controlled at some predetermined value, timer operated means for periodically adjusting said flow control means to allow air from the second space to contact said responsive means and should the absolute humidity level of the air of the second space be lower than the absolute humidity level of the air of the first space said first means will be energized, switch means associated with said timer means, and means including said switch means for causing air to flow from the second space to said first space for a predetermined period of time when said first means is energized.

5. In a humidity control system adapted to control the flow of air from a first space to a second space if the air in the first space has a lower absolute humidity than the air in the second space, valve means, a chamber having means for supplying air from the first or the second space depending upon the position of said valve means, relative humidity responsive means responsive to the moisture content of the air in said chamber, first means connected to said responsive means and being energized when the relative humidity of the air in said chamber is above a predetermined value, said first means being adapted to vary a condition effecting the relative humidity of the air in said chamber, said condition reaching a predetermined level depending upon the moisture content of the air in the first space, a sampling controller for intermittently operating said valve means to allow a quantity of air from the second space to enter said chamber, said air from the second space being effected by said level of said condition, and means responsive to any deviation in output of said relative humidity responsive means.

6. In a humidity control system for controlling a fan in a crop storage bin to obtain a maximum reduction in the moisture of a stored crop by pulling outdoor air through the crop, a chamber, air flow inlet damper means, means for inducing the flow of outdoor air or air from the top layer of the crop through said chamber depending upon the position of said air flow inlet damper means, a heater in said chamber for heating said chamber and the air passing therethrough, a moisture responsive cell having a resistance that changes with the relative humidity of the air to which the cell is exposed, said cell being placed in said chamber downstream said heater, first means including relay means for connecting said cell to control the operation of said heater so that when the relative humidity of the air in said chamber increases above a predetermined value said heater is energized to raise the temperature of said chamber and the air therein to maintain the air at a selected relative humidity, timer operated means for controlling said inlet damper means to periodically close off said outdoor air supply to said chamber and allow a sample of air from the crop to enter said chamber, relay means for controlling the exhaust fan, switch means associated with said timer operated means for periodically connecting said relay in parallel with said heater so that when said periodic sample of air from the crop is heated in said chamber and the moisture content of said sample is higher than the moisture content of the outdoor air, said exhaust fan will circulate outdoor air through the storage bin, switch means controlled by said timer for providing a holding circuit for said relay means throughout the operation of said control system between the sampling periods initiated by said inlet damper means thereby maintaining operation of the fan, a second moisture responsive cell located in the outdoor air, and means connecting said second cell to said first means to override said first cell if the relative humidity of outdoor air is below a predetermined value to maintain said fan energized regardless of whether the outdoor air moisture content is greater than the storage bin air moisture content.

7. In a humidity control system adapted to control the flow of air from a first space to a second space if the air in the first space has a lower absolute humidity than the air in the second space, a chamber, means for inducing the flow of a sample of air from the first or the second space depending upon the position of a valve means, first relative humidity responsive means responsive to the moisture content of the air in said chamber, heater means connected to said responsive means and being energized when the relative humidity of the air in said chamber is above a predetermined value to establish a predetermined temperature in said chamber depending upon the moisture content of the air, said predetermined temperature being stabilized after air from said first space flows into said chamber for a selected period of time, a sampling controller for periodically operating said valve means to allow air from the second space to enter said chamber, said air from said second space being conditioned to said predetermined temperature, control means responsive to any deviation in output of said relative humidity responsive means upon being subjected to said air from the second space, second relative humidity responsive means responsive only to air from said first space, and means connecting said second responsive means to said control means to override the response of said control means to any deviation in the output of said first relative humidity responsive means.

References Cited in the file of this patent

UNITED STATES PATENTS

| | | |
|---|---|---|
| 1,956,577 | Irwin | May 1, 1934 |
| 2,344,530 | Askew | Mar. 21, 1944 |

FOREIGN PATENTS

| | | |
|---|---|---|
| 602,402 | Great Britain | May 20, 1948 |